United States Patent [19]
Monson

[11] Patent Number: 5,689,418
[45] Date of Patent: Nov. 18, 1997

[54] AGRICULTURAL COMMUNICATION NETWORK

[75] Inventor: Robert J. Monson, St. Paul, Minn.

[73] Assignee: Ag-Chem Equipment Co., Inc., Minnetonka, Mich.

[21] Appl. No.: 367,952

[22] Filed: Jan. 3, 1995

Related U.S. Application Data

[63] Continuation of Ser. No. 95,909, Jul. 22, 1993, abandoned.
[51] Int. Cl.[6] .......................... G01V 1/00; G06F 17/00; G06G 7/48; G01W 1/10
[52] U.S. Cl. .......................... 364/420; 382/100; 395/928
[58] Field of Search .......................... 111/130; 364/420; 395/129, 200.02, 200.06, 200.09, 200.14, 727, 601, 609, 610, 615, 928; 382/100, 113

[56] References Cited

U.S. PATENT DOCUMENTS

| | | | |
|---|---|---|---|
| 4,016,542 | 4/1977 | Azure | 345/160 |
| 4,630,773 | 12/1986 | Ortlip | 239/1 |
| 4,755,942 | 7/1988 | Gardner et al. | 364/420 |
| 4,876,643 | 10/1989 | McNeill et al. | 395/290 |
| 4,996,645 | 2/1991 | Schneyderberg Van Der Zon | 364/443 |
| 5,107,443 | 4/1992 | Smith et al. | 395/331 |
| 5,124,909 | 6/1992 | Blakely et al. | 395/200.18 |
| 5,136,501 | 8/1992 | Silverman et al. | 395/237 |
| 5,220,876 | 6/1993 | Monson et al. | 111/130 |
| 5,287,453 | 2/1994 | Roberts | 395/200.03 |
| 5,297,195 | 3/1994 | Throne et al. | 379/93 |
| 5,299,207 | 3/1994 | Fujii | 395/183.21 |
| 5,323,317 | 6/1994 | Hampton et al. | 364/420 |
| 5,379,057 | 1/1995 | Clough et al. | 345/173 |
| 5,467,271 | 11/1995 | Abel et al. | 364/420 |

FOREIGN PATENT DOCUMENTS

| | | | |
|---|---|---|---|
| 203662 | 12/1986 | European Pat. Off. | B06R 16/02 |
| 460869 | 12/1991 | European Pat. Off. | G06F 15/40 |

OTHER PUBLICATIONS

"Land–Use Mapping by Digital Processing of Space Images, Hungary" by Goczan et al, Abstract, *Elsevier Science Ltd.* 1994.

Damosso et al "Network Planning Tools and Activities in Italy", 11312 MRC Mobile Radio Conference, Nov. 13–15, 1991, Nice, France, pp. 137–144.

Primary Examiner—Gail O. Hayes
Assistant Examiner—Stephen R. Tkacs
Attorney, Agent, or Firm—Haugen and Nikolai, PA

[57] ABSTRACT

An agricultural communications network including a master system which polls lower level systems for digital maps, each map comprising field character information indicative of a feature at each location of a farmer's field. An agronomist can correlate the data of the digital maps to ascertain common conditions which realize maximum yields. Farmers and their regional dealers participate in the system through subscription. Anonymity is maintained through hierarchy such that the farmers will participate in the network, thus expanding the data base for use by the agronomist. Thus, the participating subscribers facilitate expansion of the field of agronomy for the benefit of all.

8 Claims, 3 Drawing Sheets

5,689,418

AGRICULTURAL COMMUNICATION NETWORK

This is a Continuation of application Ser. No. 08/095 909, filed on Jul. 22, 1993 now abandoned.

CROSS REFERENCE TO RELATED INVENTION

Cross reference is made to a related invention disclosed in U.S. Pat. No. 5,220,876 entitled Variable Rate Application System, the subject matter of which is owned by the present applicant and the teachings of which are incorporated herein by reference.

I. Field of the Invention

The present invention relates generally to a communication network for electronically routing agricultural information, and more particularly to an apparatus and method for routing and analyzing agricultural information stored in the form of digital maps, wherein each digital map stores field character information indicative of a feature of each location of a field such as current fertilizer levels, soil type, soil history, yield data and the like.

II. Background of the Invention

Agronomy is a branch of agriculture dealing with field-crop production and soil management. One of the principle duties of an agronomist is to help a farmer ascertain the ideal combination of fertilizers in view of the various soil characteristics to help maximize the yield of a particular crop. Different fields are conducive to raising different crops, and the notion that any field is ideal for raising any crop is a misperception.

As taught in applicant's related invention disclosed in U.S. Pat. No. 5,220,876, the teachings of which are incorporated herein by reference, each location of an agricultural field is unique. For instance, each particular location within a field has a particular soil type, a present level of various fertilizers, a particular topology, field history etc. Thus, these various variables need to be taken into account when one determines the prescription for application of a blend of fertilizers for a particular type of crop to be farmed in each field. The recommended blend of fertilizers to be applied to the various locations in the field is usually determined by an agronomist known as a soil scientist, who is one skilled in the area of agronomy, and preferably, has an advanced degree such as a PHD.

A soil scientist typically ascertains field-crop production and soil management information through the implementation of closed environment studies. Namely, raising crops in a controlled environment, such as a greenhouse, and then detailing his findings in the form of charts, graphs etc. Larger data bases can be created indicating the preferred soil conditions and environments for particular types of crops to maximize yield. This prior art method for obtaining this information is limited in two ways. First, the closed environment is only a simulated condition and is not a perfect reflection of real world farming conditions. Secondly, in view of the millions of acres of farm land which exists throughout the United States and the world, the amount of input information available for forming a data base for studies is very limited.

Soil scientists, occasionally, study conditions on actual farms in furtherance of their studies and to better educate them on real world conditions. However, the information obtained is but a mere sampling of an infinite number of conditions which can exist in a field. Until now, there has been no apparatus available to an agronomist to facilitate an intensive study of the relationship between the crop yield and real world field conditions given the enormous task and the modest means available.

As outlined in great detail in the related cross reference patent assigned to the present applicant, field conditions can now be stored in digital maps for each location in a field. By processing a plurality of these digital maps at each location of a field, the farmer's application system can ascertain in near real time many field variables during the application procedure so that a custom blend of fertilizer can be applied at each location of a field. The application prescription of the blend of fertilizers is based on a soil scientist, which soil scientist is only as good as the information obtained forming a basis thereof.

The present invention is specifically directed to facilitating a great improvement of the quantity and accuracy of data available to a soil scientist to understand the relationship between crop yield and field conditions.

OBJECTS

It is a accordingly a principle object of the present invention to provide an agricultural communications network which provides a soil scientist the ability to obtain a large amount of field-crop agricultural information based on real world data.

A further object of the invention is to provide an agricultural communications network which facilitates obtaining real world information from a regional dealer and the farmer himself so that a soil scientist can perform extensive studies.

Still yet a further object of the invention is to provide an agricultural communications network which facilitates the participation of each farmer for the benefit of all.

Another object of the present invention is to provide an agricultural communications network which encourages a farmer or dealer to participate in the network without compromising the secrecy of some protected information each farmer or dealer does not wish the other to have.

SUMMARY OF THE INVENTION

The foregoing features and objects of the present invention are achieved by providing an agricultural communications network including a master data base and a plurality of dealer data bases capable of routing digital maps, each digital map comprising field character information indicative of a feature of each location of a field. Through the implementation of this network, a soil scientist uses the master data base to poll each of the dealer data bases for digital maps for studies. Through the study of the many digital maps generated and used by many farmers and dealers which are normally stored at the dealer data base, soil scientists can process the maps to ascertain similarities or differences to better understand the relationship between field conditions and crop yield.

Integrity of the communications network is maintained through hierarchy since the master data base can poll each of the dealer data bases for digital maps, but the dealer data bases cannot poll the master data base for digital maps. Rather, computed information created by the soil scientist from the studied maps can be downloaded by the master data base to each of the subscribing dealer data bases. Further, each of the dealer data bases, which are preferably comprised of terminals such as personal computers, are prohibited from exchanging digital maps therebetween to insure integrity of the network. The plurality of maps stored at the dealer data bases comprise sensitive information indicative of a farmer's soil type, soil conditions, fertilizer levels and the yield which was achieved at each location of a field. Thus, limiting access and identification of the digital maps encourages the farmer to disclose this information to the dealer such that the information can be polled by the master data base, the study of agronomy can be advanced for the benefit of each farmer who participates. Preferably, each dealer data base will participate in the network through a subscription, and the results obtained by the soil scientists will be provided to the participating dealer, who will in turn pass on the ascertained information for the benefit of their clients, the farmer himself.

In the preferred embodiment, the exchange of information between the master data base and the plurality of terminals which form the dealer data base is accomplished using a net such as Internet. This network facilitates the exchange of the digital maps between data bases using conventional phone lines, and also is used in combination with the software resident in the master system to establish the hierarchy. However, an RF link could be provided as well as a means of communication between the master data base and the dealer data base. A manual means of routing the digital maps from the dealer data base to the master will comprise the simple implementation of data discs such as 3.5 inch diskettes. Given the nature of the large network and the large territory covered by all the subscribers, an electronic means for exchanging information such as Internet is the preferred embodiment.

The digital maps stored at the dealer data base are created in a variety of ways. For instance, licensed companies can provide digital maps including information such as the topography and the soil content of a field, such as using infrared technology through the use of satellites located in space. Other digital maps, such as the actual fertilizer levels in a farmer's field are created by the farmer himself as fertilizer is dispensed according to a prescription map such that the maps are truly indicative of real world conditions. Thus, if a spreading apparatus dispenses fertilizer slightly different than the prescription programmed, the map generated and stored at the dealer data base is reflective of actual conditions. Similarly, yield maps are created by the farmer while harvesting the crop, wherein the yield at each location of the field is stored in a map. All these maps which are eventually stored at the dealer data base can be polled by the master data base to facilitate the studies of the soil scientist. The number of maps and the information stored therein is almost limitless, as is the information that can be obtained therefrom by the soil scientist.

DETAILED DESCRIPTION OF THE PREFERRED EMBODIMENT

Figure 1:
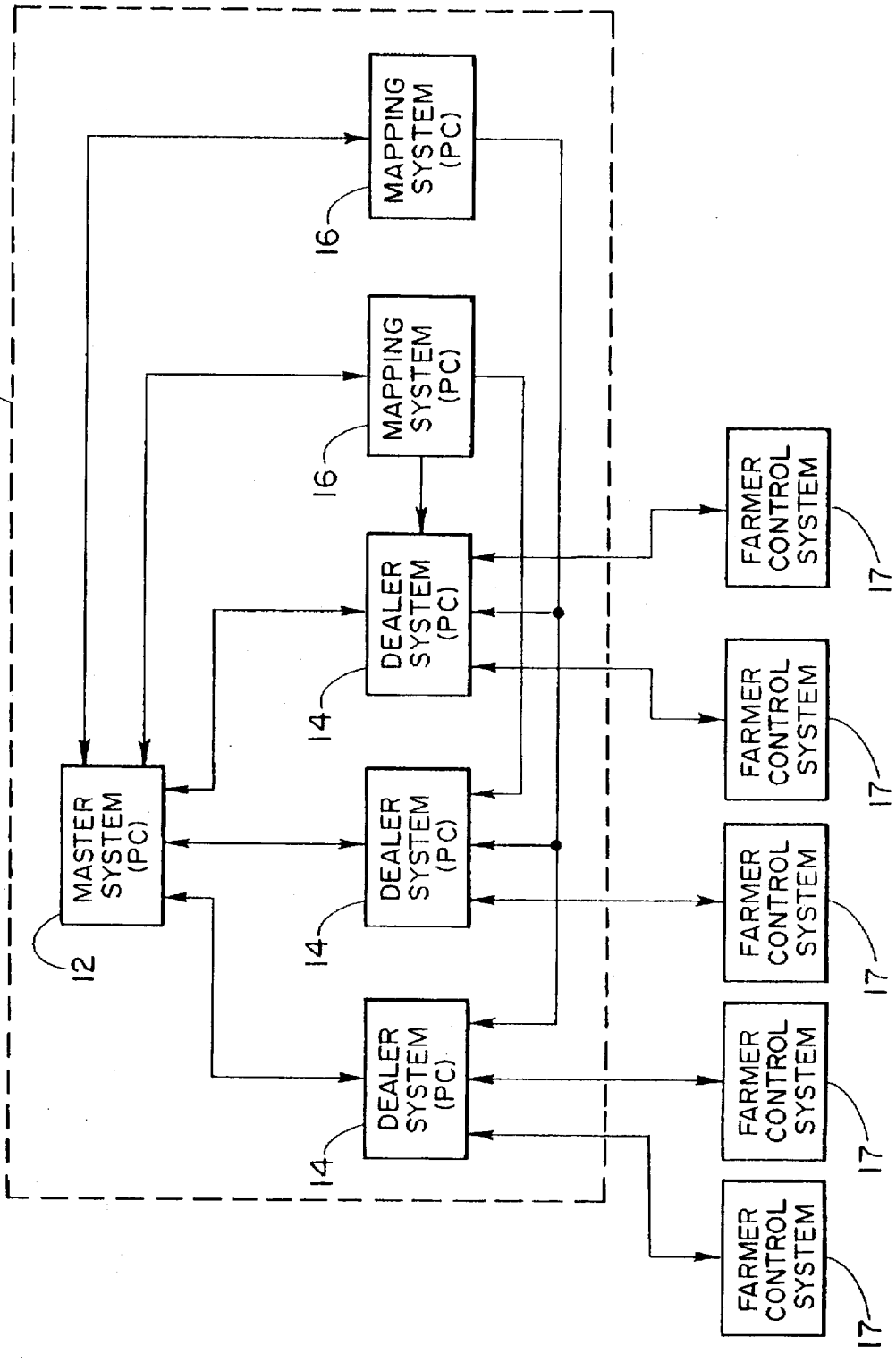
FIG. 1 is a block diagram shown the hierarchy of a agricultural communications network showing the relationship between the master data base and the plurality of dealers the mapping systems and the farmer himself.

Referring now to FIG. 1, a block diagram of an agricultural communication network according to the preferred embodiment of the present invention is generally shown at 10. Network 10 is designed with hierarchy and comprises three types of nodes, namely, an upper level or master system generally shown at 12, and two lower levels including a plurality of dealer systems 14 and a plurality of mapping systems 16. The hierarchy of system 10 is designed in software of master system 12 such that master system 12 can poll any of dealer systems 14 or mapping systems 16 for digital data maps 18 (see FIGS. 4A–4D). However, none of dealer systems 14 or mapping systems 16 can obtain these digital data maps from one another or from master system 12. Rather, the master is used to disseminate data on the network. This may include maps and programs as well as information. Thus, access restrictions are built into this system to maintain anonymity, and the secrecy which is normally associated with this data can be maintained to encourage the farmers to participate in making data available to the network. System 10 is organized under a subscription arrangement, thus, to encourage voluntary subscription, protection of farmer's trade secret information must be maintained. The data which a soil scientist compiles from the data maps using master system 12 is made available to the subscribing farmers, dealers and licensed mapping systems such that the subscribers benefit through participation.

More specifically now, system 10 establishes communications between each of the nodes using a well known net called Internet, which is maintained by universities such as the University of Minnesota. Information such as the digital data maps is exchanged between the appropriate nodes using an established net and using commercial phone lines. However, it is to be recognized that each of the nodes could communicate via other well known nets such as RF links or via standard phone lines by implementing modems. Internet is preferred due to its well structured format, its virtually unlimited data storage capabilities, and its high speed of data transmission.

Further, Internet facilitates establishing the hierarchy in conjunction with the software in master system 12 such that information including the digital maps can only be transferred in predetermined directions, as shown by the arrows in FIG. 1 and discussed previously, and further, facilitates the use of passwords. Thus, any of the nodes can be established onto the link using passwords, where source identity is made known to Internet through the password, and wherein a destination can be designated through a simple predetermined code. The Internet system will handle all the logistics of transferring a data file from one node, known as the source, to the destination. Transferring files between sources and destinations using Internet is well known in the art and is beyond the teachings of this invention.

Figure 4A:
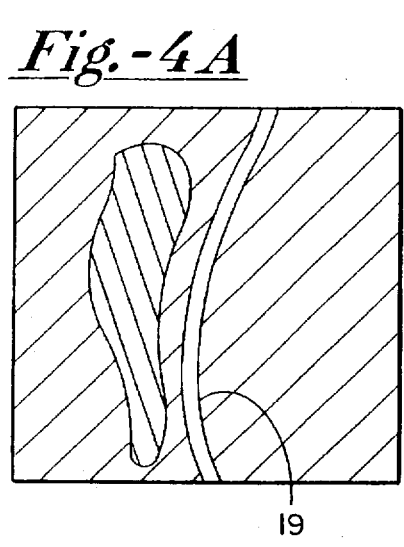
FIG. 4A through 4D are pictorial representations of typical digital data maps stored in the dealer data base terminal and are comprised of homogenous maps indicating like features throughout a particular field.
Figure 4B:
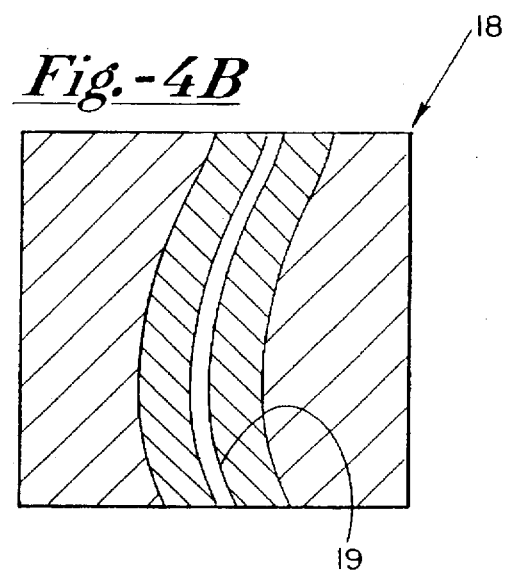
Figure 4C:
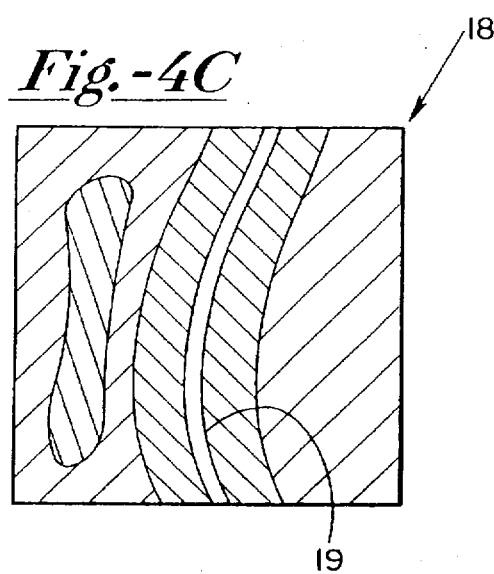
Figure 4D:
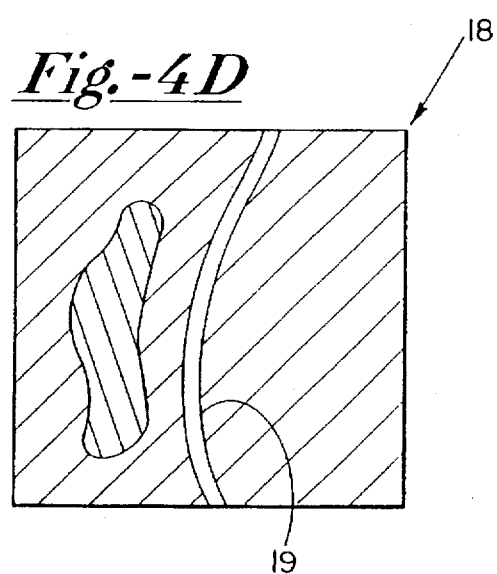

As discussed in great detail in cross-referenced U.S. Pat. No. 5,220,876 entitled Variable Rate Application System assigned to the present applicant, and U.S. Pat. No. 4,630,773 to Ortlip entitled Method and Apparatus for Spreading Fertilizer, also owned by the present applicant, a variety of digital data maps 18 are known to be available for transferring between the nodes of the present invention. As discussed in these related references, each digital map 18 contains field character information indicative of a feature at each location of a field, wherein a river 19 is shown in each map for reference. For instance, the map shown in FIG. 4A comprises a homogenous soil map indicating soil type in a field representing 100 acres of land, wherein the boundaries of the map correspond to the boundaries of the field. The four corners of the digitized map correspond to the southwest corner of the map, the southeast corner, the northeast corner and the northwest corner of the field. Each map is represented as a pixel array having a size of 250 pixels, for example, but limitation to the size is not to be inferred. In FIG. 4B, a homogenous map indicating the yield obtained from each location in a field for a given year is shown. Each pixel represents a portion of a field such as a 6'×6' portion, wherein the pixel has a value, represented as a color, assigned thereto indicating a yield. For instance, a pixel may be assigned a value of zero and colored red indicating no yield for that particular 6'×6' portion, or a 10 and colored yellow indicating a yield of say 10 bushels for that given 6'×6' portion, or any number inbetween with the proportional yield. As shown in FIG. 4C this map represents actual fertilizer application data indicative of the quantity of a particular type of fertilizer, such as nitrogen, potassium or phosphorous, at each location of the same field parcel. In FIG. 4D, the digital data map represents topography, wherein the pixel information represents a particular slope or inclination such as a one degree grade, at each location of the same field parcel. However, limitation to the digital maps shown in FIGS. 4A–4D is not to be inferred. Rather, a digital map which comprises field character information indicative of a particular feature at each location of the field is encompassed by this invention.

While each digital map 18 ideally represents a portion of a field identical in size, limitation to a plurality of digital maps representing identically sized parcels of a field is not to be inferred. Further, the maps can be based on boundary equations as well, and limitation to a map based on a pixel array is not to be inferred. Equations can be used to reduce the size of memory necessary to store maps of large and multiple fields, for instance. However, in the preferred embodiment, pixels are used where each pixel or portion of the maps corresponds to a discrete portion of the field. Each pixel has a relative value for that discrete portion of the field. Each digital map is stored in RAM and/or ROM memory of the respective node and can be communicated therebetween as will now be described.

Figure 2:
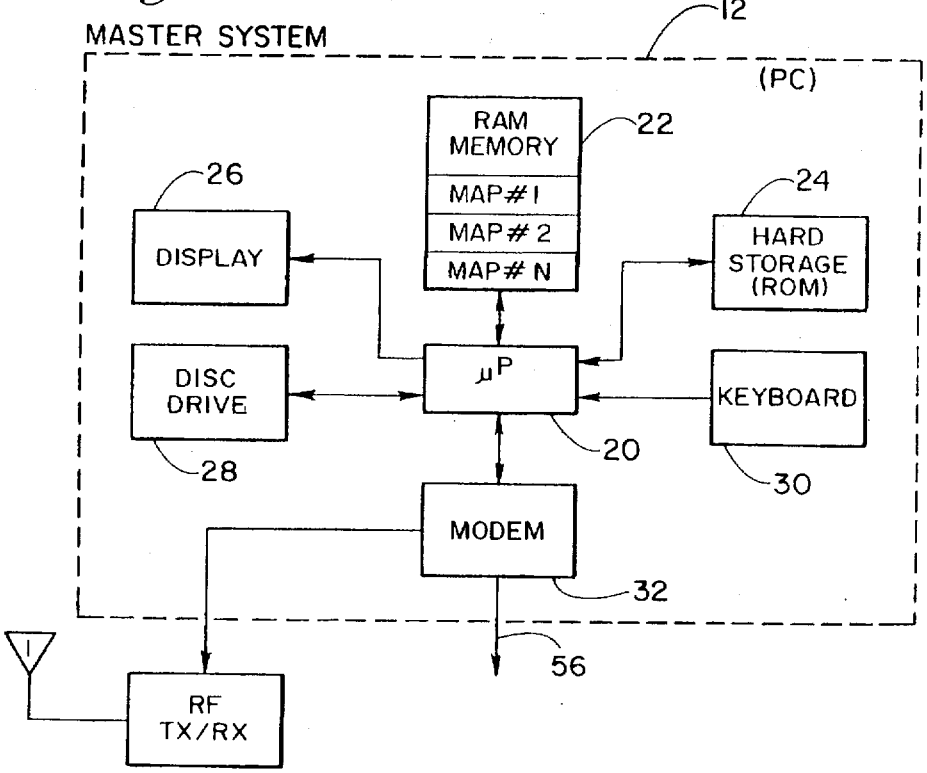
FIG. 2 is a block diagram of the master data base which is available to a soil scientist for polling the digital data maps from the dealer data bases.

Referring to FIG. 2, a block diagram of the master system 12 generally shown in FIG. 1 is illustrated and is preferably comprised of a personal computer such as an IBM 386. As shown, master system 12 comprises a high speed microprocessor 20, RAM memory 22 for storing digital data maps, ROM memory 24 providing hard storage for software, a display 26, a disc drive 28 such as a 3.5 inch diskette drive, and a keyboard or other input control device 30. Master system 12 also includes a data interface 32 such as modem for facilitating data transfer from microprocessor 20 to other nodes of system 10.

Modem 32 provides a data interface to other nodes of the system 10 and is adapted to communicate via a net such as Internet. However, an RF transceiver/receiver 34 is provided as well for providing an RF interface between master system 12 and other nodes of the network. Hence, limitation to a hard-wire net is not to be inferred.

Figure 3:
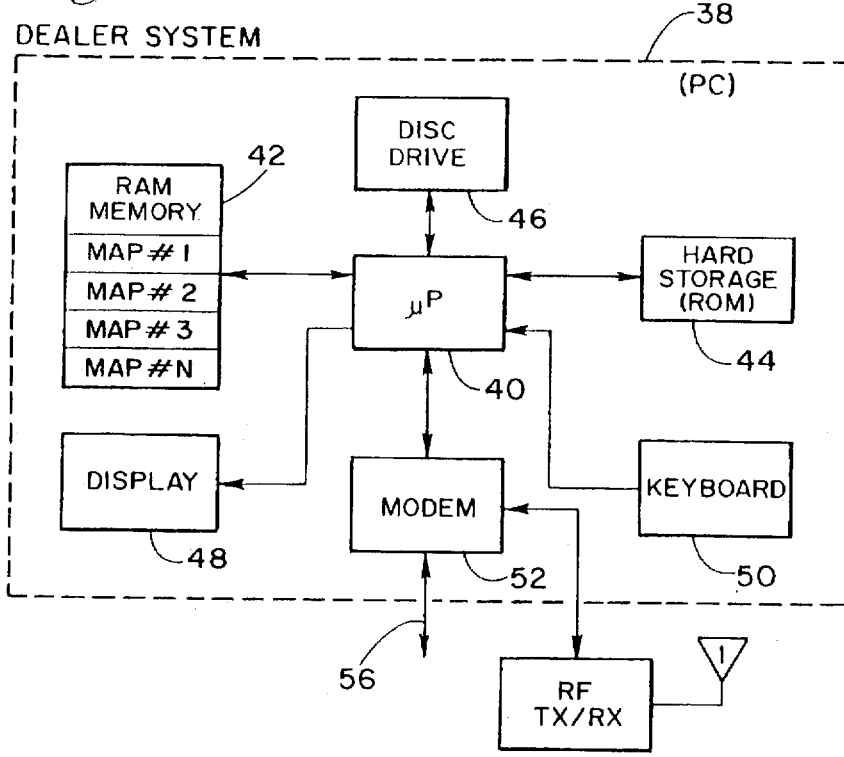
FIG. 3 is a block diagram of one terminal comprised of personal computer forming a portion of the dealer data base shown in FIG. 1 illustrating the storage of a plurality of digital maps indicative of field character information for one or more farmers, which information can be ascertained through an interface such as a modem.

Referring now to FIG. 3, a block diagram of a terminal 38 forming a portion of dealer system 14 illustrated in FIG. 1 is shown. Similar to master system 12, dealer system terminal 38 comprises a high speed microprocessor 40, RAM memory 42, ROM memory 44 for storing software, a disc drive such as a 3.5 inch diskette drive 46, a display 48 and a keyboard 50. A modem 52 is provided for interfacing and communicating data between processor 40 and other nodes of network 10. An RF interface including an RF transceiver/receiver 54 is provided as well for facilitating transferring of data via RF. However, modem 52 is preferably coupled to a phone line shown at 56, which phone line is selectively connected to a net such as Internet.

As shown in FIG. 3, RAM memory 42 is partitioned to store a plurality of digital maps 18 previously described. The plurality of maps 18 polled and representing conditions on a plurality of farm fields for a plurality of farmers are all stored in memory 42. For instance, when master system 12 polls a particular dealer system 14 via Internet for maps, such as all maps which are indicative of corn yields for 1993, the maps are stored in memory 42. The maps can also be input by inserting diskettes having the digital maps into disc drive 46 and can then downloaded into memory 42.

Referring now back to FIG. 1, each mapping system 16 is capable of creating most maps required for the application of a fertilizer blend for each farmer's field. For instance, maps including information of the terrain or topology, or soil content of a field. These maps can be generated using infrared technology and ascertained by satellite in space for particular chosen fields. Besides creating some of the individual maps at mapping system 16, mapping system 16 also creates the suggested application map for a particular farmer's field based on information from the soil scientist which is downloaded thereto from master system 12. The suggested application map generated by the particular mapping system 16 is sent to a particular dealer system 14 upon request, such as by mailing. However, Internet could be used as well for transferring data files if desired. Each mapping system 16, is preferably a licensed or wholly owned vendor in the business of generating individual maps and generating suggested soil prescriptions (application maps) based on information resident at the mapping system and obtained soil scientist information from the master system 12.

Each of dealer systems 14 makes the final fertilizer recommendations, thus minimal modifications of the suggested application maps received from mapping system 16 is possible. Specifically, each dealer system 14 is capable of modifying a suggested application map based on particular farmer's financial, legal, and ethical requirements. Thus, dealer system 14 is responsible for creating the actual disc with parameters defined and utilized by the farmer's spreader system 17. This spreading system 17 resident with the farmer is discussed in applicant's related invention previously referenced.

Each farmer also has the ability to generate digital maps using spreader 17 such as yield maps for their fields. These yield maps are indicative of the yield from each field location and are generated during harvesting for each location of a field. Since the control system 17 resident in the farmer's equipment has a navigation system (see related invention), the volume or mass of the harvest sensed as the equipment traverses a field can be stored into a digital map. This generated yield map can then be sent by disc or Internet to a particular regional dealer 14 and stored thereat, and eventually cross-referenced with other maps including the actual prescription application map, the soil type maps etc.

Further, it is noted the farmer ultimately generates the actual fertilizer application map(s) stored at dealer system 14, and while the suggested prescription application map provided by the dealer to the farmer is used during the spreading operation, the actual spreading or fertilizer blend applied to the field can vary slightly due to variations in the spreading mechanism. Thus, it is the actual blending ratios that the farmer dispenses onto his field that are stored into a digital map and which is provided to the regional dealer 14. Thus, master system 12 polls the yield maps and the actual application maps from the dealers for further processing.

One of the principle features of the present invention is that master system 12 can poll any and all maps stored in terminals 38 of dealer system 14 and mapping system 16. Thus, master system 12 can define statistical relations that previously were not known to exist. For example, master system 12 can poll all known application maps from 1993 with corn planted, and compared yield maps for the same subset. The parameters these areas had in common can be defined, aiding a researcher in defining the combination of inputs that yielded the best results. As an obvious enhancement to the system, the same data could be polled and analyzed over a series of years to define inter-yearly reactions that are not presently known. With the additional accuracy of the application system or control system 17 which is used by the farmer to spread a fertilizer blend, as discussed in the referenced related patent, and with the accurate spatial yield data stored in the maps generated by the farmer's control system 17, the data loop can be closed at the level of master system 12.

The data gained from this system guarantees anonymity for the farmers, thus encouraging the farmers to participate such that great amounts of data is available to master system 12. The resulting correlations are also a value to seed companies, fertilizer manufactures, as well as the dealers and end users themselves.

Another principle feature of the agricultural communications network 10 is the ability of the dealers to store and maintain their own files while still allowing the master system 12 access to the digital data maps for statistical processing. This greatly simplifies the record keeping process.

The use of Internet as a net allows great simplicity in the transfer of data, facilitates establishing hierarchy, and removes the need for a direct system to system connect. This effectively allows each user including dealer system 14, master system 12 and mapping system 16, the capability of infinite data storage. At a reasonably small cost, this allows the dealer to maintain an account on an Internet supplier.

Another feature of the present communications network 10 is that either dealer system 14 or mapping system 16 can create the suggested spreading map for the farmer's control system 17. Thus, while in the preferred embodiment mapping system 16 generates the suggested spreading map, dealer system 14 could do the same if supplied with the resources of mapping system 16. In the preferred embodiment, dealer system 14 is operated and maintained by a farmer's regional dealer who is knowledgeable in agronomy and can make specific recommendations and minimal modifications to the suggested spreading maps ascertained from mapping system 16. Such recommendations could include a customer's financial, legal, and ethical requirements. The farmer simply visits his regional dealer who has all the digital maps for his field, including maps containing information on soil content, current fertilizer levels, moisture content, etc.

During the spreading operation, the particular farmer's control system 17 generates a digital map in real time indicative of the actual level of the fertilizer blend which exists on the field after the spreading operation. This map is formed from the fertilizer blend which is actually spread in combination with the level of fertilizers which previously existed before the spreading operation. In effect, the map indicating the current level before spreading of fertilizers is updated during the spreading operation. This digital map is then returned to the dealer for incorporation into network 10 and is stored at dealer system 14. As previously described, master system 12 has access to these maps, as well as the yield maps such that an agronomist can perform studies and calculations to develop recommendations for farmers in the future. The general information that can be obtained from the maps of all users can be supplied to all users who are subscribed to this system. Thus, information relating to the general trends visible throughout the industry, which are not based just on theory, but rather on real world correlations, are available to the subscribers so that all farmers can realize higher yields in the future.

The use of an international network such as Internet allows simple expansion of system 10 without input from the proprietor of the system, and thus provides automatic maintenance and improvement. Since the communication net Internet is already in use and available for this invention, the users of system 10 simply purchase accounts for use on this network. Automatic invoicing and record keeping can also be maintained through the use of Internet.

In summary, the present agricultural communications network provides the agronomist with a powerful network to obtain large quantities of real world data. By encouraging participation of the farmers and the farmer's dealers, real world conditions including field conditions, fertilizer levels and yield data can be polled and processed by the master system. Correlation of data stored in the maps for the field subsets can be analyzed for trends, and similarities based on a large quantity of data. By maintaining anonymity for the farmers, and establishing limited access through hierarchy such that only the master can obtain data from any of the other nodes, the farmers will be assured that their proprietary information will be available only to the agronomist and not directly to other parties. The communications net Internet is already in service and is readily adapted to be implemented by the present system. Further, the technology for creating digital data maps and implementing them in the spreading operation is already available as discussed in the related referenced patent to the applicant. The present invention advances the state of the art by allowing data compilation at the master level of all the data utilized and obtained from the lower levels, namely, the farmer, the regional dealer and the mapping systems. Statistics and correlations based on real world results, not theory, can be obtained.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

I claim:

1. An agricultural communication network system, comprising:

(a) at least one electronic dealer station having storage means storing a plurality of individual digital maps therein, each of said digital maps characterized as comprising agricultural-related data geo-referenced to an individual one of a plurality of agricultural fields, said dealer station including a transmitting means for transmitting a preselected one of said digital maps when polled;

(b) master processing means geographically located remote from said dealer station for polling said dealer station, said master processing means including receiving means for receiving said preselected digital map along with said agricultural-related data polled from said dealer station, said master processing means further including memory means for storing said preselected polled digital map and its agricultural-related data;

(c) communication means for electronically communicating each of said digital maps and its agricultural-related data between said dealer station and said master processing means;

(d) wherein each said dealer station comprises an electronic terminal, and wherein each said electronic terminal storage means stores a plurality of said digital maps therein;

(e) wherein said master processing means further includes security means for restricting access of said digital map stored therein by said dealer station; and (f) wherein said master processing means further includes distribution means for selectively distributing said digital maps stored in said memory means to selected said terminals.

2. The network system as specified in claim 1 wherein said analyzing means also correlates said digital maps as a function of said at least one preselected parameter when analyzing said digital maps.

3. An agricultural communication network system, comprising:

(a) master processing means comprising memory means having a plurality of individual digital maps contained therein, each of said digital maps characterized as comprising agricultural-related data geo-referenced to an individual one of a plurality of agricultural fields, said master processing means comprising analyzing means for analyzing said digital maps stored in said memory means and providing an output indicative of said analyzed digital maps, whereby said analyzing means analyzes selected said digital maps as a function of at least one preselected parameter to provide said output, said master processing means comprising transmitting means for transmitting said output;

(b) at least one electronic dealer station geographically located remote from said master processing means having receiving means for receiving said output from said master processing means;

(c) communication means for electronically communicating said output from said master processing means to said dealer station; and (d) wherein said analyzing means analyzes selected of said plurality of digital maps stored in said memory means to provide said output by correlating selected of said digital maps as a function of said selected parameter.

4. The network system as specified in claim 3 wherein each said dealer station comprises an electronic terminal, each terminal comprising a personal computer having storage means for storing said output received from said master processing means.

5. The network system as specified in claim 4 wherein each said terminal further comprises security means for restricting access of said digital maps stored in said respective storage means from other said terminals.

6. The network system as specified in claim 4 wherein said plurality of electronic dealer stations are geographically distributed and remotely located from one another.

7. The network system as specified in claim 3 wherein said network system comprises a plurality of said electronic dealer stations, wherein said output comprises at least one said digital map, and said communicating means electronically communicating said outputted digital maps between said master processing means and each of said electronic dealer stations.

8. A method of implementing an agricultural communication network system, comprising:

(a) at least one electronic dealer station having storage means storing a plurality of individual digital maps therein, said digital maps characterized as comprising agricultural-related data geo-referenced to an individual one of a plurality of agricultural fields, said dealer station including a transmitting means for transmitting preselected ones of said digital maps when polled;

(b) master processing means geographically located remote from said dealer station for polling said dealer station, said master processing means including receiving means for receiving preselected ones of said digital maps polled from said dealer station, said master processing means further including memory means for storing said preselected polled digital map; and (c) communication means for electronically communicating said digital maps between said dealer station and said master processing means; and (d) wherein said network system master processing means further comprising analyzing means for analyzing preselected individual ones of said digital maps stored in said memory means and providing an output indicative of said analyzed digital maps, whereby said analyzing means analyzes and correlates selected said digital maps as a function of at least one selected parameter to provide said output, said master processing means further comprising downloading means for downloading said output to said dealer station;

comprising the steps of:

(i) storing at least one of the plurality of digital maps in said storage means of at least one said electronic dealer station;

(ii) polling at least one said dealer stations using said master processing means to retrieve at least one of said digital maps stored in said storage means via said communication means; and (iii) analyzing at least one of said retrieved digital maps stored in said memory means using said analyzing means and providing an output by correlating preselected ones of said digital maps as a function of at least one selected parameter, and downloading said output to said dealer station using said downloading means.

* * * * *

UNITED STATES PATENT AND TRADEMARK OFFICE
CERTIFICATE OF CORRECTION

PATENT NO. : 5,689,418
DATED : November 18, 1997
INVENTOR(S) : Robert J. Monson

It is certified that error appears in the above-indentified patent and that said Letters Patent is hereby corrected as shown below:

Column 9, line 20, after "terminal" insert --, each terminal comprising a personal computer --.

Signed and Sealed this

Thirteenth Day of January, 1998

Attest:

Attesting Officer

BRUCE LEHMAN

Commissioner of Patents and Trademarks